United States Patent Office 2,820,788
Patented Jan. 21, 1958

2,820,788
PROCESS FOR PREPARING SODIUM SULFOMETHYLCELLULOSE

William F. Filbert and Mack F. Fuller, Woodbury, N. J., assignors to E. I. du Pont de Nemours and Company, Wilmington, Del., a corporation of Delaware No Drawing. Application February 24, 1955
Serial No. 490,404

2 Claims. (Cl. 260—231)

This invention relates to a new composition of matter and to a novel process for its preparation. More particularly this invention relates to the novel chemical composition, sodium sulfomethylcellulose having the general formula:

(Cellulose)—O—CH$_2$SO$_2$ONa

Sulfomethylcellulose is an ether of cellulose which is obtained when one or more hydrogen atoms of the several reactive hydroxyl groups in a cellulose unit are replaced by the monovalent —(CH$_2$SO$_2$OH) radical. In any single anhydroglucose unit of cellulose, there are three reactive hydroxyl groups susceptible of etherification. Cellulose which is etherified to the maximum possible extent is thus said to have a Degree of Etherification (D. E.) of 3.0. A numerical D. E. of less than 3.0 represents the average number of etherified hydroxyl groups per anhydroglucose unit of cellulose.

The primary object of the present invention is the preparation of the afore-named chemical composition and the development of a process for this purpose. Other and additional objects will become apparent from a consideration of the following description.

According to the present invention sodium sulfomethylcellulose is prepared by the reaction of cellulose with sodium chloromethyl sulfonate in the presence of caustic soda and an inert organic diluent at elevated temperatures. Sodium chloromethylsulfonate can be prepared in 90–95% yields by heating methylene chloride and sodium sulfite in 20% aqueous solution at 130° C. for one hour. The invention will be more readily understood from the following examples:

Example 1

A pressure vessel provided with a means of agitation was charged with 10 grams of wood pulp cut to pass a 60-mesh screen, 10 grams of sodium chloromethyl sulfonate, 7.5 grams of 97% NaOH, 10 grams of water, and 140 grams of 97% isopropanol. Air was removed from the reactor by alternately evacuating and flushing with nitrogen a total of 10 times. The reactor was quickly heated to 140° C. and held at that temperature for a period of one hour. After cooling, the product was removed, neutralized with acetic acid, washed free of salts with aqueous methanol and dried. The product, sodium sulfomethylcellulose, was an off-white powder having a D. E. of 0.39. It was completely water-soluble.

Example 2

The procedure of Example 1 was repeated using a 50/50 (by weight) toluene/ethanol mixture in lieu of the isopropanol. This time the reactor was heated to 125° C. and maintained at that temperature for a period of two hours. The sodium sulfomethylcellulose product had a D. E. of 0.25 and was completely water-soluble.

Numerous other diluents may be used as alternatives to those illustrated in the foregoing examples. Isopropanol, n-propanol, and t-butanol have been found to be especially suitable. The diluent should be present in sufficient proportions to maintain a reaction medium of a slurry-like consistency.

The optimum operating temperature will vary somewhat with the particular diluent employed. Generally, temperatures upwards of 100° C. are required, though the reaction may proceed very slowly at slightly lower temperatures. With the diluents enumerated above, best results are achieved at temperatures between about 120° and 140° C.

The new chemical composition is useful as a flocculating agent for dispersions and emulsions, as an additive for controlling the rate of setting of Portland cement and plaster of Paris, as a detergent assistant, and as a drilling mud additive.

It is intended that the invention be limited only by the following claims.

We claim:
1. A process for the preparation of sodium sulfomethylcellulose which comprises reacting cellulose with sodium chloromethylsulfonate in the presence of sodium hydroxide and an inert organic diluent at a temperature in the range of about 100° C. to about 140° C.
2. A process as in claim 1 wherein the reaction is carried out in the temperature range of about 120° to 140° C.

References Cited in the file of this patent

UNITED STATES PATENTS

| | | |
|---|---|---|
| 2,422,000 | Dickey | June 10, 1947 |
| 2,524,024 | Swinehart et al. | Sept. 26, 1950 |
| 2,580,352 | Grassie | Dec. 25, 1951 |
| 2,591,748 | Vaughan | Apr. 8, 1952 |

OTHER REFERENCES

"Cellulose and Cellulose Derivatives," part II, Interscience Publishers Inc., New York, New York (1954), page 886.